(12) United States Patent
Chuang et al.

(10) Patent No.: US 12,479,535 B2
(45) Date of Patent: Nov. 25, 2025

(54) PAIRING METHOD AND BICYCLE CONTROL SYSTEM

(71) Applicant: TEKTRO TECHNOLOGY CORPORATION, Sioushuei Township (TW)

(72) Inventors: Hsun-Yu Chuang, Sioushuei Township (TW); Hung-Jui Lin, Sioushuei Township (TW)

(73) Assignee: TEKTRO TECHNOLOGY CORPORATION, Sioushuei Township (TW)

( * ) Notice: Subject to any disclaimer, the term of this patent is extended or adjusted under 35 U.S.C. 154(b) by 293 days.

(21) Appl. No.: 18/226,679

(22) Filed: Jul. 26, 2023

(65) Prior Publication Data
US 2024/0034432 A1 Feb. 1, 2024

(30) Foreign Application Priority Data
Jul. 27, 2022 (TW) .................. 111128112

(51) Int. Cl.
| | | |
|---|---|---|
| *B62M 9/122* | (2010.01) | |
| *B62J 43/10* | (2020.01) | |
| *B62J 45/41* | (2020.01) | |
| *B62M 9/128* | (2010.01) | |
| *B62J 50/22* | (2020.01) | |
| *B62M 9/132* | (2010.01) | |

(52) U.S. Cl.
CPC .............. *B62M 9/122* (2013.01); *B62J 43/10* (2020.02); *B62J 45/41* (2020.02); *B62M 9/128* (2013.01); *B62J 50/22* (2020.02); *B62M 9/132* (2013.01)

(58) Field of Classification Search
CPC ...... B62M 9/122; B62M 9/128; B62M 9/132; B62M 25/08; B62M 6/45; B62M 6/50; B62M 9/04; B62M 25/00; B62J 43/10; B62J 45/41; B62J 50/22; B62J 43/30; B62J 45/00; B62J 45/20; B62J 45/40; H04W 4/80; H04W 4/70; H04L 67/12; H04L 67/125
See application file for complete search history.

(56) References Cited

U.S. PATENT DOCUMENTS

| | | | |
|---|---|---|---|
| 9,394,030 B2* | 7/2016 | Shipman ................ | B62J 43/30 |
| 10,511,945 B2* | 12/2019 | Masuda ................ | H04W 4/80 |
| 2004/0113386 A1* | 6/2004 | Dal Pra' ................ | B62M 9/16 |
| | | | 280/260 |
| 2021/0276664 A1* | 9/2021 | Yang ................ | B62K 23/06 |
| 2023/0109945 A1* | 4/2023 | Garnica ................ | B62J 45/20 |
| | | | 701/51 |
| 2025/0026438 A1* | 1/2025 | Weinmann ............... | B62M 6/45 |

* cited by examiner

*Primary Examiner* — Richard M Camby
(74) *Attorney, Agent, or Firm* — NIXON PEABODY LLP

(57) ABSTRACT

A pairing method is adapted for a first bicycle assembly and a second bicycle assembly. The pairing method includes driving the first bicycle assembly to perform a self-check procedure and determining whether the first bicycle assembly passes the self-check procedure. If yes, completing pairing between the first bicycle assembly and the second bicycle assembly. If no, not completing pairing between the first bicycle assembly and the second bicycle assembly.

14 Claims, 3 Drawing Sheets

PAIRING METHOD AND BICYCLE CONTROL SYSTEM

CROSS-REFERENCE TO RELATED APPLICATIONS

This non-provisional application claims priority under 35 U.S.C. § 119(a) on Patent Application No(s). 111128112 filed in Taiwan, R.O.C. on Jul. 27, 2022, the entire contents of which are hereby incorporated by reference.

TECHNICAL FIELD

The disclosure relates to a pairing method and a bicycle control system.

BACKGROUND

As bicycle industry progresses, a mechanical derailleur of the bicycle is gradually replaced with an electronic derailleur. The electronic derailleur can be driven by a wireless signal for shifting gear position. This type of the electronic derailleur can be called a wireless electronic derailleur.

In general, the wireless electronic derailleur is in wireless signal communication with a control center, and the control center is in signal communication with a shift device for the operation of a user. In order to enable the wireless electronic derailleur can be driven by signals transmitted from the control center, the wireless electronic derailleur is required to pair with the control center. However, before the wireless electronic derailleur pairs with the control center, the user may have no idea about whether functions of the wireless electronic derailleur are normal. As a result, the wireless electronic derailleur may still pair with the control center under an abnormal condition, and the user may not find out the abnormal issues of the wireless electronic derailleur until riding the bicycle, which reduces the riding experience. Therefore, how to solve the aforementioned issue is one of the crucial topics in this field.

SUMMARY

The disclosure provides a pairing method and a bicycle control system which are capable of preventing a derailleur in an abnormal state from pairing with the control center.

One embodiment of the disclosure provides a pairing method, adapted for a first bicycle assembly and a second bicycle assembly. The pairing method includes driving the first bicycle assembly to perform a self-check procedure and determining whether the first bicycle assembly passes the self-check procedure. If yes, completing pairing between the first bicycle assembly and the second bicycle assembly. If no, not completing pairing between the first bicycle assembly and the second bicycle assembly.

Another embodiment of the disclosure provides a bicycle control system. The bicycle control system includes a first bicycle assembly and a second bicycle assembly. The first bicycle assembly completes to pair with the second bicycle assembly after passing a self-check procedure.

Still another embodiment of the disclosure a bicycle control system. The bicycle control system includes a first bicycle assembly. The first bicycle assembly includes a control unit, a function chip unit, a driving unit and a power unit. The function chip unit, the driving unit and the power unit are electrically connected to the control unit. The first bicycle assembly completes to pair with another bicycle assembly after passing a self-check procedure for at least one of the function chip unit, the driving unit and the power unit.

According to the pairing method and the bicycle control systems as discussed in the above embodiments, the first bicycle assembly completes to pair with the second bicycle assembly only after the first bicycle assembly passes the self-check procedure. As a result, the first bicycle assembly which successfully pairs with the second bicycle assembly is determined to be in the normal state and can be directly used. In other words, the first bicycle assembly in an abnormal state can be prevented from pairing with the second bicycle assembly.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
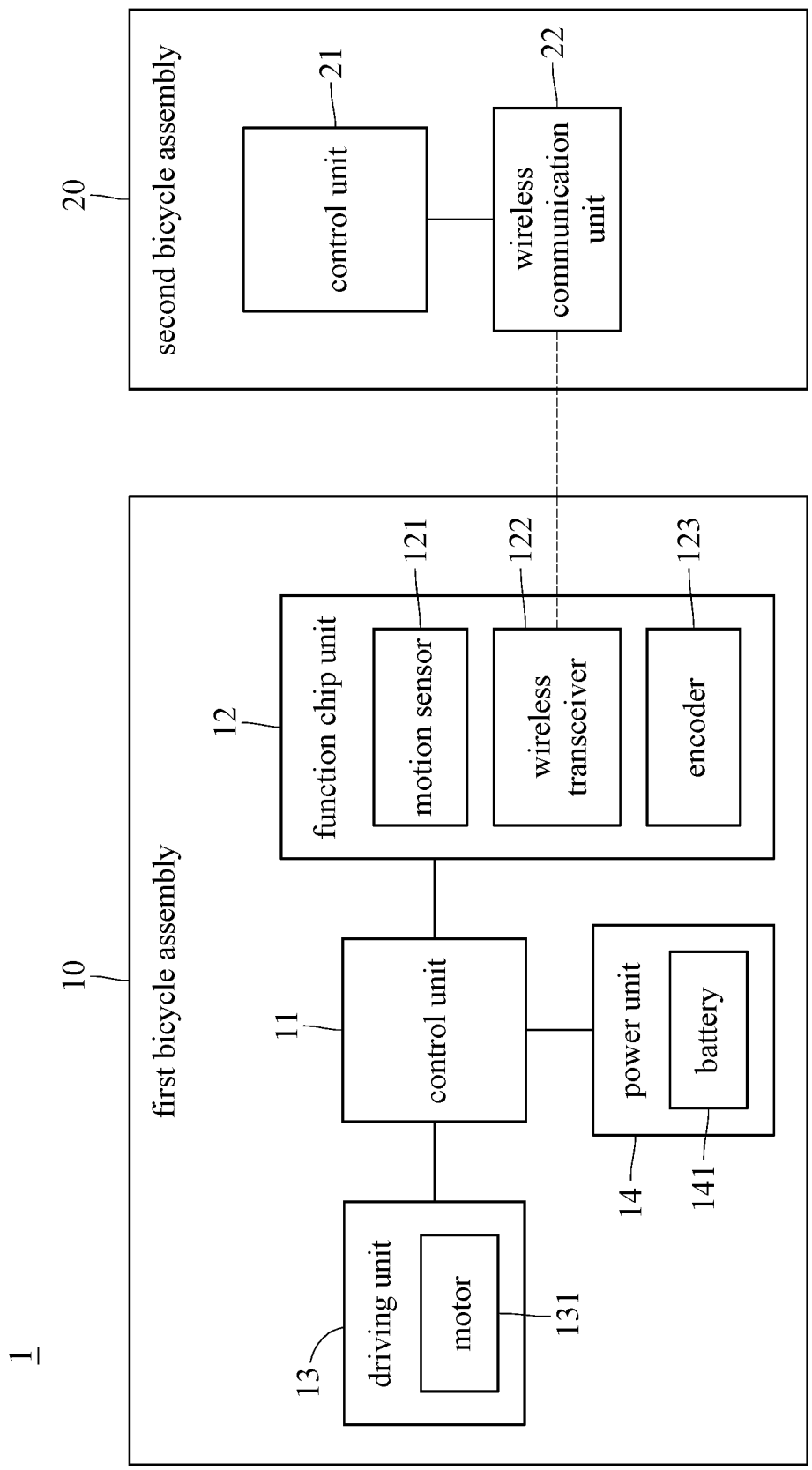
FIG. 1 is a block diagram of a bicycle control system according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Referring to FIG. 1, FIG. 1 is a block diagram of a bicycle control system 1 according to one embodiment of the disclosure. In FIG. 1, a line connecting two components represents that these two components are in signal communication with each other; that is, a signal can be transmitted between them.

In this embodiment, the bicycle control system 1 includes a first bicycle assembly and a second bicycle assembly 20. The first bicycle assembly 10 is, for example, a rear derailleur. The first bicycle assembly 10 includes a control unit 11, a function chip unit 12, a driving unit 13 and a power unit 14. The control unit 11 is in signal communication with the function chip unit 12, the driving unit 13 and the power unit 14; that is, a signal can be transmitted between the control unit 11 and each of the function chip unit 12, the driving unit 13 and the power unit 14.

The function chip unit 12 includes a motion sensor 121, a wireless transceiver 122 and an encoder 123. The motion sensor 121 is, for example, a G-sensor, and the motion sensor 121 is configured to sense a motion of a bicycle. A. The wireless transceiver 122 is, for example, a Bluetooth transceiver. The wireless transceiver 122 is configured to transmit or receive a wireless signal. The encoder 123 is configured to detect the gear position of the rear derailleur. The driving unit 13, for example, includes a motor 131. The motor 131 is configured to drive a chain guide of the rear derailleur. The power unit 14, for example, includes a battery 141, and the battery 141 is configured to provide electricity required in the operation of the rear derailleur.

The second bicycle assembly 20 is, for example, a control center, and the second bicycle assembly 20 may be integrated on a gear shift device (not shown) which can be operated by a user, or may be independent from the gear shift device. The second bicycle assembly 20 includes a control unit 21 and a wireless communication unit 22 which is electrically connected to and in signal communication with the wireless communication unit 22. The wireless communication unit 22 may be wirelessly in signal communication with the wireless transceiver 122 of the first bicycle assembly 10. After the user operates the gear shift device, the control unit 21 of the second bicycle assembly 20 drives the wireless communication unit 22 to transmit a shift signal to the wireless transceiver 122 of the first bicycle assembly 10. Then, the control unit 11 of the first bicycle assembly 10 drives the driving unit 13 for gear shift. In addition, the wireless communication unit 22 of the second bicycle assembly 20 may be wirelessly in signal communication with an external device (not shown), and this external device may be a terminal device, such as a smart phone or a computer. Therefore, the external device can be used to set up the second bicycle assembly 20 or the first bicycle assembly 10 through the second bicycle assembly 20.

In order to enable the first bicycle assembly 10 to be driven by the shift signal transmitted by the second bicycle assembly 20, the first bicycle assembly 10 is required to be paired with the second bicycle assembly 20. The following paragraphs will introduce a pairing method adapted for the first bicycle assembly 10 and the second bicycle assembly 20.

Figure 2:
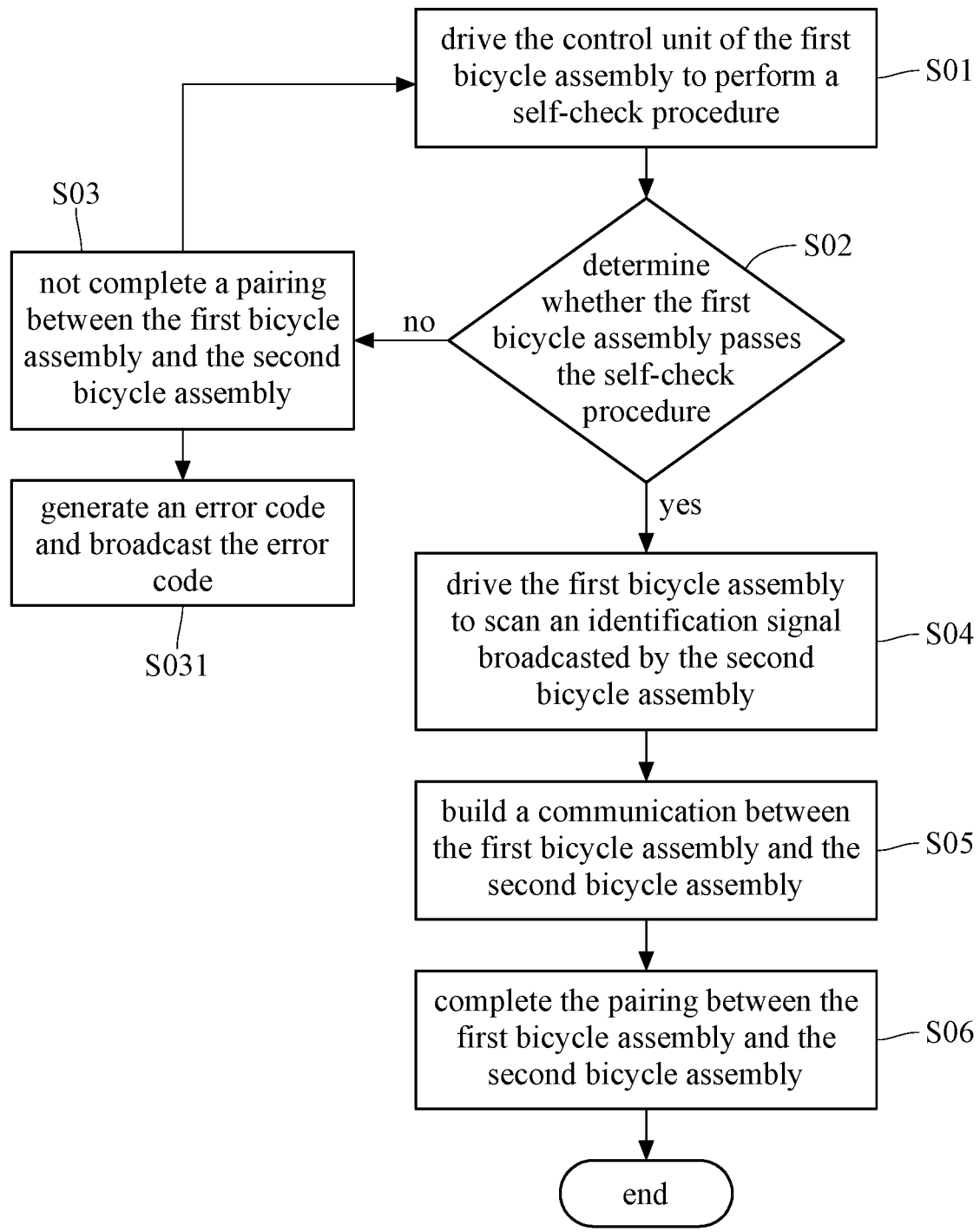
FIG. 2 is a flow chart of a pairing method cooperated with the bicycle control system in FIG. 1.

Referring to FIG. 2, FIG. 2 is a flow chart of a pairing method cooperated with the bicycle control system 1 in FIG. 1.

In the pairing method, a step S01 is firstly performed to drive the control unit 11 of the first bicycle assembly 10 to perform a self-check procedure. The self-check procedure may be initiated by pressing a button on the first bicycle assembly 10 or when the battery 141 is properly installed and starts to provide electricity.

The self-check procedure includes determining whether at least one of the function chip unit 12, the driving unit 13 and the power unit 14 is normal. The following paragraphs will further introduce the self-check procedure.

Determining whether the function chip unit 12 is normal refers to determining whether a signal transmitted by at least one of the motion sensor 121, the wireless transceiver 122 and the encoder 123 satisfies a predetermined signal, or determining whether at least one of the motion sensor 121, the wireless transceiver 122 and the encoder 123 transmits a signal. Specifically, determining whether the function chip unit 12 is normal can refer to determining whether one, two or all of the motion sensor 121, the wireless transceiver 122 and the encoder 123 transmit signals satisfying predetermined signals or transmit signals. For example, one of the motion sensor 121, the wireless transceiver 122 and the encoder 123 which has highest malfunction possibility may be selected to be determined whether the signal transmitted therefrom satisfies the predetermined signal or whether a signal is transmitted therefrom for determining whether the function chip unit 12 is normal. Alternatively, two of the motion sensor 121, the wireless transceiver 122 and the encoder 123 may be randomly selected to be determined whether the signals transmitted therefrom satisfy the predetermined signals or whether signals are transmitted therefrom for determining whether the function chip unit 12 is normal. Still alternatively, all of the motion sensor 121, the wireless transceiver 122 and the encoder 123 may be determined whether the signals transmitted therefrom satisfy the predetermined signals or whether signals are transmitted therefrom for determining whether the function chip unit 12 is normal. When at least one of the motion sensor 121, the wireless transceiver 122 and the encoder 123 transmits the signal satisfying the predetermined signal or transmits a signal, the function chip unit 12 is determined to be normal. In contrast, when at least one of the motion sensor 121, the wireless transceiver 122 and the encoder 123 transmits the signal not satisfying the predetermined signal or does not transmit a signal, the function chip unit 12 is determined to be abnormal. In such a case, it represents that at least one of the motion sensor 121, the wireless transceiver 122 and the encoder 123 may be abnormal in communication or damaged and require to be maintained.

Determining whether the driving unit 13 is normal refers to determining whether a current applied to the motor 131 is greater than a predetermined current. When the current applied to the motor 131 is greater than the predetermined current, the driving unit 13 is determined to be abnormal. In such a case, it may represent the motor 131 or gears connected to the motor 131 may have problems in operation (e.g., stuck issues) and require maintenance. In contrast, when the current applied to the motor 131 is smaller than or equal to the predetermined current, the driving unit 13 is determined to be normal.

Determining whether the power unit 14 is normal refers to determining whether a remaining capacity of the battery 141 is greater than a predetermined capacity. When the remaining capacity of the battery 141 is greater than the predetermined capacity, the power unit 14 is determined to be normal. In contrast, when the remaining capacity of the battery 141 is smaller than or equal to the predetermined capacity, the power unit 14 is determined to be abnormal. In such a case, it represents that the remaining capacity of the battery 141 is insufficient and the battery 141 requires to be replaced or recharged.

Then, a step S02 is performed to determine whether the first bicycle assembly 10 passes the self-check procedure. Specifically, the so-called self-check procedure includes determining whether at least one of the function chip unit 12, the driving unit 13 and the power unit 14 is normal, which represents that the self-check procedure may include determining whether one, two or all of the function chip unit 12, the driving unit 13 and the power unit 14 are normal. For example, one of the function chip unit 12, the driving unit 13 and the power unit 14 which has the highest malfunction possibility may be selected to be determined whether it is normal for determining whether the first bicycle assembly 10 passes the self-check procedure. Alternatively, two of the function chip unit 12, the driving unit 13 and the power unit 14 may be randomly selected to be determined whether they are normal for determining whether the first bicycle assembly 10 passes the self-check procedure. Still alternatively, all of the function chip unit 12, the driving unit 13 and the power unit 14 may be selected to be determined whether they are normal for determining whether the first bicycle assembly 10 passes the self-check procedure.

In the self-check procedure, when at least one of the function chip unit 12, the driving unit 13 and the power unit 14 is abnormal, it represents that the first bicycle assembly does not pass the self-check procedure. In such a case, a step S03 is performed to not complete a pairing between the first bicycle assembly 10 and the second bicycle assembly 20, and then a step S031 is performed to generate an error code and broadcast the error code. Specifically, in the case that the first bicycle assembly 10 does not pass the self-check procedure, it represents that at least one of the function chip unit 12, the driving unit 13 and the power unit 14 is abnormal, and thus corresponding error code is generated and broadcasted to the second bicycle assembly 20 or the external device (e.g., a smart phone) directly. Therefore, a maintainer can obtain an error information corresponding to the error code from an interface of an application in the external device by communicating the external device with the second bicycle assembly 20 or directly from the external device for performing maintenance. After the step S031, proceed back to the step S01. In contrast, when at least one of the function chip unit 12, the driving unit 13 and the power unit 14 is normal, it represents that the first bicycle assembly 10 passes the self-check procedure. In such a case, a step S04 is performed after the step S02.

Then, the step S04 is performed to drive the first bicycle assembly 10 to scan an identification signal broadcasted by the second bicycle assembly 20. Then, a step S05 is performed to build a communication between the first bicycle assembly 10 and the second bicycle assembly 20.

Specifically, in the step S04, the wireless transceiver 122 of the first bicycle assembly 10 scans the identification signal broadcasted by the wireless communication unit 22 of the second bicycle assembly 20, where the identification signal includes an identification information of the second bicycle assembly 20. After the wireless transceiver 122 of the first bicycle assembly 10 scans the identification signal broadcasted by the wireless communication unit 22 of the second bicycle assembly 20, the step S05 is performed to build a communication between the wireless transceiver 122 of the first bicycle assembly 10 and the wireless communication unit 22 of the second bicycle assembly 20, such that signals can be transmitted between the wireless transceiver 122 of the first bicycle assembly 10 and the wireless communication unit 22 of the second bicycle assembly 20. At this moment, the second bicycle assembly 20 obtains the identification information of the first bicycle assembly 10.

Then, a step S06 is performed to complete the pairing between the first bicycle assembly 10 and the second bicycle assembly 20. Specifically, the wireless transceiver 122 of the first bicycle assembly 10 transmits a requiring pairing signal. After the wireless communication unit 22 of the second bicycle assembly 20 receives this requiring pairing signal, the wireless communication unit 22 of the second bicycle assembly 20 responses a pairing finished signal to the wireless transceiver 122 of the first bicycle assembly 10 according to the requiring pairing signal, such that the first bicycle assembly 10 and the second bicycle assembly 20 store pairing information, thereby completing the pairing between the first bicycle assembly 10 and the second bicycle assembly 20. In other words, after the completion of the pairing between the first bicycle assembly 10 and the second bicycle assembly 20, signals transmitted between the first bicycle assembly 10 and the second bicycle assembly 20 are encrypted. As a result, the first bicycle assembly 10 is merely driven by a shift signal transmitted by the second bicycle assembly 20.

Note that the step S06 is not restricted to directly performed after the step S05; in some other embodiments, after the step 505, the wireless communication unit 22 of the second bicycle assembly 20 may transmit a signal to the wireless transceiver 122 of the first bicycle assembly 10 in advance, requesting it to initiate the pairing process, followed by the execution of the step S06.

Figure 3:
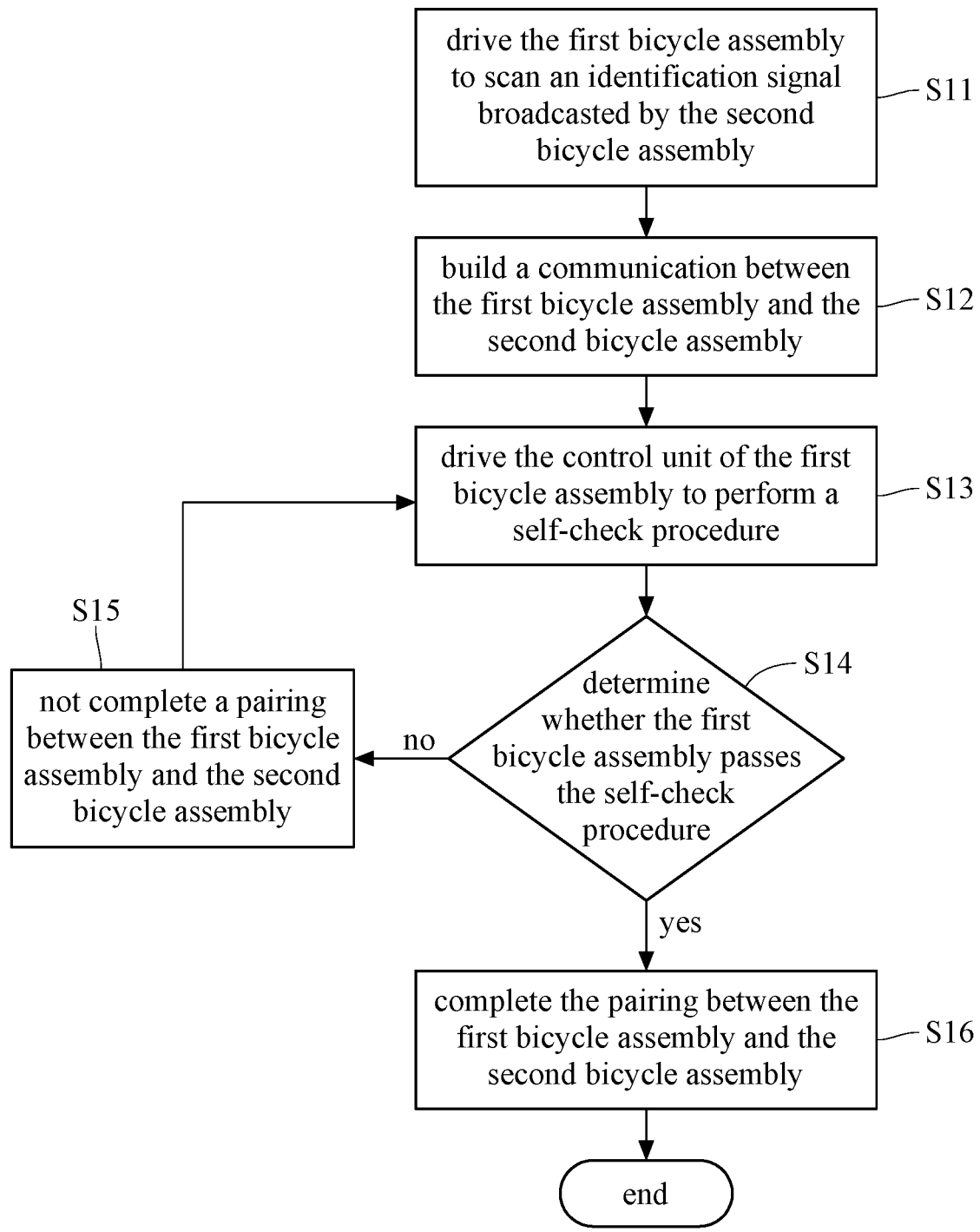
FIG. 3 is a flow chart of another pairing method cooperated with the bicycle control system in FIG. 1.

Then, referring to FIG. 3, FIG. 3 is a flow chart of another pairing method cooperated with the bicycle control system 1 in FIG. 1.

In the pairing method, a step S11 is firstly performed to drive the first bicycle assembly 10 to scan an identification signal broadcasted by the second bicycle assembly 20. Then, a step S12 is performed to build a communication between the first bicycle assembly and the second bicycle assembly 20.

Specifically, in the step S11, the wireless transceiver 122 of the first bicycle assembly 10 scans the identification signal broadcasted by the wireless communication unit 22 of the second bicycle assembly 20, where the identification signal includes an identification information of the second bicycle assembly 20. After the wireless transceiver 122 of the first bicycle assembly 10 scans the identification signal broadcasted by the wireless communication unit 22 of the second bicycle assembly 20, the step S12 is performed to build a communication between the wireless transceiver 122 of the first bicycle assembly 10 and the wireless communication unit 22 of the second bicycle assembly 20, such that signals can be transmitted between the wireless transceiver 122 of the first bicycle assembly 10 and the wireless communication unit 22 of the second bicycle assembly 20. At this moment, the second bicycle assembly 20 obtains the identification information of the first bicycle assembly 10.

Then, a step S13 is performed to drive the control unit 11 of the first bicycle assembly 10 to perform a self-check procedure. The self-check procedure may be initiated by pressing a button on the first bicycle assembly 10 or when the battery 141 is properly installed and starts to provide electricity.

The self-check procedure includes determining whether at least one of the function chip unit 12, the driving unit 13 and the power unit 14 is normal. The following paragraphs will further introduce the self-check procedure.

Determining whether the function chip unit 12 is normal refers to determining whether a signal transmitted by at least one of the motion sensor 121, the wireless transceiver 122 and the encoder 123 satisfies a predetermined signal, or determine whether at least one of the motion sensor 121, the wireless transceiver 122 and the encoder 123 transmit a signal. Specifically, determining whether the function chip unit 12 is normal can refer to determining whether one, two or all of the motion sensor 121, the wireless transceiver 122 and the encoder 123 transmit signals satisfying predetermined signals or transmit signals. For example, one of the motion sensor 121, the wireless transceiver 122 and the encoder 123 which has highest malfunction possibility may be selected to be determined whether the signal transmitted therefrom satisfies the predetermined signal or whether a signal is transmitted therefrom for determining whether the function chip unit 12 is normal. Alternatively, two of the motion sensor 121, the wireless transceiver 122 and the encoder 123 may be randomly selected to be determined whether the signals transmitted therefrom satisfy the predetermined signals or whether signals are transmitted therefrom for determining whether the function chip unit 12 is normal. Still alternatively, all of the motion sensor 121, the wireless transceiver 122 and the encoder 123 may be determined whether the signals transmitted therefrom satisfy the predetermined signals or whether signals are transmitted therefrom for determining whether the function chip unit 12 is normal. When at least one of the motion sensor 121, the wireless transceiver 122 and the encoder 123 transmits the signal satisfying the predetermined signal or transmits a signal, the function chip unit 12 is determined to be normal. In contrast, when at least one of the motion sensor 121, the wireless transceiver 122 and the encoder 123 transmits the signal not satisfying the predetermined signal or does not transmit a signal, the function chip unit 12 is determined to be abnormal. In such a case, it represents that at least one of the motion sensor 121, the wireless transceiver 122 and the encoder 123 may be abnormal in communication or damaged and require to be maintained.

Determining whether the driving unit 13 is normal refers to determining whether a current applied to the motor 131 is greater than a predetermined current. When the current applied to the motor 131 is greater than the predetermined current, the driving unit 13 is determined to be abnormal. In such a case, it may represent the motor 131 or gears connected to the motor 131 may have problems in operation (e.g., stuck issues) and require maintenance. In contrast, when the current applied to the motor 131 is smaller than or equal to the predetermined current, the driving unit 13 is determined to be normal.

Determining whether the power unit 14 is normal refers to determining whether a remaining capacity of the battery 141 is greater than a predetermined capacity. When the remaining capacity of the battery 141 is greater than the predetermined capacity, the power unit 14 is determined to be normal. In contrast, when the remaining capacity of the battery 141 is smaller than or equal to the predetermined capacity, the power unit 14 is determined to be abnormal. In such a case, it represents that the remaining capacity of the battery 141 is insufficient and the battery 141 requires to be replaced or recharged.

Then, a step S14 is performed to determine whether the first bicycle assembly 10 passes the self-check procedure. Specifically, the so-called self-check procedure includes determining whether at least one of the function chip unit 12, the driving unit 13 and the power unit 14 is normal, which represents that the self-check procedure may include determining whether one, two or all of the function chip unit 12, the driving unit 13 and the power unit 14 are normal. For example, one of the function chip unit 12, the driving unit 13 and the power unit 14 which has the highest malfunction possibility may be selected to be determined whether it is normal for determining whether the first bicycle assembly 10 passes the self-check procedure. Alternatively, two of the function chip unit 12, the driving unit 13 and the power unit 14 may be randomly selected to be determined whether they are normal for determining whether the first bicycle assembly 10 passes the self-check procedure. Still alternatively, all of the function chip unit 12, the driving unit 13 and the power unit 14 may be selected to be determined whether they are normal for determining whether the first bicycle assembly 10 passes the self-check procedure.

In the self-check procedure, when at least one of the function chip unit 12, the driving unit 13 and the power unit 14 is abnormal, it represents that the first bicycle assembly 10 does not pass the self-check procedure. In such a case, a step S15 is performed to not complete a pairing between the first bicycle assembly 10 and the second bicycle assembly 20, and then the step S13 is performed again. In contrast, when at least one of the function chip unit 12, the driving unit 13 and the power unit 14 is normal, it represents that the first bicycle assembly 10 passes the self-check procedure. In such a case, a step S16 is performed after the step S14 to complete the pairing between the first bicycle assembly 10 and the second bicycle assembly 20. Specifically, the wireless transceiver 122 of the first bicycle assembly 10 transmits a requiring pairing signal. After the wireless communication unit 22 of the second bicycle assembly 20 receives this requiring pairing signal, the wireless communication unit 22 of the second bicycle assembly 20 responses a pairing finished signal to the wireless transceiver 122 of the first bicycle assembly 10 according to the requiring pairing signal, such that the first bicycle assembly 10 and the second bicycle assembly 20 store pairing information, thereby completing the pairing between the first bicycle assembly 10 and the second bicycle assembly 20. In other words, after the completion of pairing between the first bicycle assembly 10 and the second bicycle assembly 20, signals transmitted between the first bicycle assembly 10 and the second bicycle assembly 20 are encrypted. As a result, the first bicycle assembly 10 is merely driven by a shift signal transmitted by the second bicycle assembly 20.

Note that the first bicycle assembly 10 is not restricted to being a rear derailleur; in some other embodiments, the first bicycle assembly 10 may be a front derailleur or an internal gear hub disposed on a rear wheel of a bicycle.

According to the pairing methods and the bicycle control system as discussed in the above embodiments, the first bicycle assembly completes to pair with the second bicycle assembly only after the first bicycle assembly passes the self-check procedure. As a result, the first bicycle assembly which successfully pairs with the second bicycle assembly is determined to be in the normal state and can be directly used. In other words, the first bicycle assembly in an abnormal state can be prevented from pairing with the second bicycle assembly.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A pairing method, adapted for a first bicycle assembly and a second bicycle assembly, comprising:
   driving the first bicycle assembly to perform a self-check procedure; and
   determining whether the first bicycle assembly passes the self-check procedure;
   if yes, completing pairing between the first bicycle assembly and the second bicycle assembly; and
   if no, not completing pairing between the first bicycle assembly and the second bicycle assembly.

2. The pairing method according to claim 1, wherein completing pairing between the first bicycle assembly and the second bicycle assembly is that the first bicycle assembly transmits a requiring pairing signal to the second bicycle assembly, and the second bicycle assembly responses a pairing finished signal to the first bicycle assembly according to the requiring pairing signal, such that the first bicycle assembly and the second bicycle assembly store pairing information.

3. The pairing method according to claim 1, wherein if the first bicycle assembly passes the self-check procedure, before completing pairing between the first bicycle assembly and the second bicycle assembly, the pairing method further comprises driving the first bicycle assembly to scan an identification signal broadcasted by the second bicycle assembly, and building a communication between the first bicycle assembly and the second bicycle assembly.

4. The pairing method according to claim 1, wherein before driving the first bicycle assembly to perform the self-check procedure, the pairing method further comprises driving the first bicycle assembly to scan an identification signal broadcasted by the second bicycle assembly, and building a communication between the first bicycle assembly and the second bicycle assembly.

5. The pairing method according to claim 1, wherein the first bicycle assembly is a bicycle rear derailleur, the first bicycle assembly comprises a function chip unit, a driving unit and a power unit, the self-check procedure comprises determining whether at least one of the function chip unit, the driving unit and the power unit is normal;
  if yes, the first bicycle assembly is determined to pass the self-check procedure; and
  if no, the first bicycle assembly is determined to fail to pass the self-check procedure.

6. The pairing method according to claim 5, wherein the function chip unit comprises a motion sensor, a wireless transceiver and an encoder, and determining whether the function chip unit is normal is determining whether a signal transmitted by at least one of the motion sensor, the wireless transceiver and the encoder satisfies a predetermined signal or whether at least one of the motion sensor, the wireless transceiver and the encoder transmits a signal;
  if yes, the function chip unit is determined to be normal; and
  if no, the function chip unit is determined to be abnormal.

7. The pairing method according to claim 5, wherein the driving unit comprises a motor, and determining whether the driving unit is normal is determining whether a current applied to the motor is greater than a predetermined current;
  if yes, the driving unit is determined to be abnormal; and
  if no, the driving unit is determined to be normal.

8. The pairing method according to claim 5, wherein the power unit comprises a battery, and determining whether the power unit is normal is determining whether a remain capacity of the battery is greater than a predetermined capacity;
  if yes, the power unit is determined to be normal; and
  if no, the power unit is determined to be abnormal.

9. A bicycle control system, comprising:
  a first bicycle assembly; and
  a second bicycle assembly;
  wherein the first bicycle assembly completes to pair with the second bicycle assembly after passing a self-check procedure,
    wherein after the first bicycle assembly passes the self-check procedure, the first bicycle assembly scans an identification signal broadcasted by the second bicycle assembly, builds a communication with the second bicycle assembly, and then completes to pair with the second bicycle assembly.

10. A bicycle control system, comprising:
  a first bicycle assembly; and
  a second bicycle assembly,
  wherein the first bicycle assembly completes to pair with the second bicycle assembly after passing a self-check procedure,
  wherein the first bicycle assembly performs the self-check procedure after scanning an identification signal broadcasted by the second bicycle assembly and building a communication with the second bicycle assembly.

11. A bicycle control system, comprising:
  a first bicycle assembly; and
  a second bicycle assembly,
  wherein the first bicycle assembly completes to pair with the second bicycle assembly after passing a self-check procedure,
  wherein the first bicycle assembly comprises a function chip unit, a driving unit and a power unit, and the self-check procedure comprises determining whether at least one of the function chip unit, the driving unit and the power unit is normal.

12. A bicycle control system, comprising:
  a first bicycle assembly, comprising:
    a control unit;
    a function chip unit, electrically connected to the control unit;
    a driving unit, electrically connected to the control unit; and
    a power unit, electrically connected to the control unit;
  wherein the first bicycle assembly completes to pair with another bicycle assembly after passing a self-check procedure for at least one of the function chip unit, the driving unit and the power unit.

13. The bicycle control system according to claim 12, wherein after the first bicycle assembly passes the self-check procedure, the first bicycle assembly scans an identification signal broadcasted by the another bicycle assembly, builds a communication with the another bicycle assembly, and then completes to pair with the another bicycle assembly.

14. The bicycle control system according to claim 12, wherein the first bicycle assembly performs the self-check procedure after scanning an identification signal broadcasted by the another bicycle assembly and building a communication with the another bicycle assembly.

* * * * *